US010934370B2

(12) United States Patent
Cho et al.

(10) Patent No.: US 10,934,370 B2
(45) Date of Patent: Mar. 2, 2021

(54) HYBRID SUPPORTED METALLOGEN CATALYST, METHOD FOR PREPARING OLEFIN POLYMER BY USING SAME, AND OLEFIN POLYMER HAVING IMPROVED MELT STRENGTH (71) Applicant: HANWHA CHEMICAL CORPORATION, Seoul (KR)

(72) Inventors: Ah Ra Cho, Daejeon (KR); Ah Reum Kim, Sejong-si (KR); Lan Hua Piao, Seoul (KR); Jun Ho Seo, Daejeon (KR); Song Hee Yang, Incheon (KR); So Jung Lee, Daejeon (KR); Yu Jeong Lim, Busan (KR); Dong Wook Jeong, Daejeon (KR); Seung Il Choi, Jeollanam-do (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 208 days.

(21) Appl. No.: 16/066,907

(22) PCT Filed: Mar. 29, 2016

(86) PCT No.: PCT/KR2016/003178
§ 371 (c)(1),
(2) Date: Jun. 28, 2018

(87) PCT Pub. No.: WO2017/115927
PCT Pub. Date: Jul. 6, 2017

(65) Prior Publication Data
US 2019/0023816 A1 Jan. 24, 2019

(30) Foreign Application Priority Data

Dec. 31, 2015 (KR) .................. 10-2015-0190739

(51) Int. Cl.
C08F 4/6592 (2006.01)
C08F 210/16 (2006.01)
B01J 31/22 (2006.01)
C08F 4/659 (2006.01)
C08F 10/02 (2006.01)
C08F 10/06 (2006.01)
C08F 10/08 (2006.01)
C08F 10/14 (2006.01)

(52) U.S. Cl.
CPC ....... C08F 4/65925 (2013.01); B01J 31/2295 (2013.01); C08F 210/16 (2013.01); B01J 2231/12 (2013.01); C08F 4/65912 (2013.01); C08F 4/65916 (2013.01); C08F 10/02 (2013.01); C08F 10/06 (2013.01); C08F 10/08 (2013.01); C08F 10/14 (2013.01); C08F 2500/01 (2013.01); C08F 2500/04 (2013.01); C08F 2500/07 (2013.01); C08F 2500/12 (2013.01)

(58) Field of Classification Search
USPC .................................. 526/119, 114
See application file for complete search history.

(56) References Cited

U.S. PATENT DOCUMENTS

| 5,536,796 | A | 7/1996 | Jejelowo et al. |
| 6,420,501 | B1 | 7/2002 | Uwai et al. |
| 6,420,580 | B1 | 7/2002 | Holtcamp et al. |
| 6,469,113 | B1 | 10/2002 | Lee et al. |
| 6,870,015 | B2 | 3/2005 | Oshima et al. |
| 7,572,875 | B2 | 8/2009 | Jensen et al. |
| 7,678,866 | B2 | 3/2010 | Yamada et al. |
| 7,999,039 | B2 | 8/2011 | DeGroot et al. |
| 8,268,944 | B2 | 9/2012 | Yang et al. |
| 8,507,621 | B2 | 8/2013 | Jayaratne et al. |
| 8,716,415 | B2 | 5/2014 | Kim et al. |
| 2004/0225088 | A1* | 11/2004 | Vaughan ........... C08F 10/00 526/114 |
| 2006/0199914 | A1 | 9/2006 | Harris et al. |
| 2010/0016526 | A1 | 1/2010 | Etherton et al. |

FOREIGN PATENT DOCUMENTS

| CN | 1263537 A | 8/2000 |
| CN | 1279694 A | 1/2001 |
| CN | 1408738 A | 4/2003 |
| CN | 102666599 A | 9/2012 |
| EP | 1300425 A2 | 4/2003 |
| JP | 2007197722 A | 8/2007 |
| JP | 2008231433 A | 10/2008 |
| JP | 2014210937 A | 11/2014 |

(Continued)

OTHER PUBLICATIONS

KIPO Grant of Patent issued in Korean Patent Application No. 10-2016-0061892 dated Feb. 27, 2017 with translation, 4 pages.
International Search Report issued in PCT/KR2016/003178 dated Dec. 8, 2016 with partial translation, 9 pages.
Extended European Search Report for European Application No. 16 881.880.5, dated Jan. 27, 2020, 10 pages
Chinese Office Action issued in Chinese Application No. 201680077296. 4, dated Jul. 29, 2020 with translation, 16 pages.

Primary Examiner — Fred M Teskin (74) Attorney, Agent, or Firm — RatnerPrestia (57) ABSTRACT The invention relates to: a hybrid supported metallocene catalyst includes at least one first metallocene compound among the compounds represented by chemical formula 1, at least one second metallocene compound among the compounds represented by chemical formula 2 and a cocatalyst compound; a method for preparing an ethylene-α-olefin copolymer, comprising polymerizing olefin monomers in the presence thereof; and an ethylene-α-olefin copolymer having improved melt strength.

6 Claims, 4 Drawing Sheets (56) References Cited

FOREIGN PATENT DOCUMENTS

| KR | 20040093465 A | 11/2004 |
| KR | 20080057279 A | 6/2008 |
| KR | 20080104331 A | 12/2008 |

* cited by examiner

HYBRID SUPPORTED METALLOGEN CATALYST, METHOD FOR PREPARING OLEFIN POLYMER BY USING SAME, AND OLEFIN POLYMER HAVING IMPROVED MELT STRENGTH

CROSS REFERENCE TO RELATED APPLICATIONS

This application is the U.S. National Phase Application of PCT/KR2016/003178, filed Mar. 29, 2016, which claims priority to Korean Patent Application No. 10-2015-01090739, filed Dec. 31, 2015, the contents of such applications being incorporated by reference herein.

TECHNICAL FIELD

The present invention relates to a hybrid metallocene-supported catalyst, a method of preparing an olefin polymer using the same, and an olefin polymer having improved melt strength.

BACKGROUND ART

A metallocene compound is a compound in which a transition metal or a transition metal halide compound is coordinate-bonded with a ligand such as a cyclopentadienyl group (Cp), an indenyl group, or a cycloheptadienyl group, and has a sandwich structure as its basic form.

A metallocene catalyst is a single-site catalyst including the above metallocene compound and a co-catalyst such as methylaluminoxane. A polymer obtained by the polymerization using the metallocene catalyst has a narrow molecular weight distribution and a uniform comonomer distribution. The metallocene catalyst has higher copolymerization activity than a Ziegler-Natta catalyst.

The metallocene catalyst can be used to obtain polymers having different stereoregularity depending on the structure of the ligand even when the same monomer is used.

DISCLOSURE

Technical Problem

An object of the present invention is to provide a hybrid metallocene-supported catalyst which can be used to improve the melt strength of an olefin polymer.

Another object of the present invention is to provide a method of preparing an olefin polymer having improved melt strength.

Still another object of the present invention is to provide an olefin polymer having improved melt strength.

Technical Solution

In an aspect of the present invention, there is provided a hybrid metallocene-supported catalyst, including: a carrier; at least one first metallocene compound supported in the carrier, among compounds represented by Chemical Formula 1; at least one second metallocene compound supported in the carrier, among compounds represented by Chemical Formula 2; and a co-catalyst compound supported in the carrier.

<Chemical Formula 1>

In Chemical Formula 1, in *-MX$_2$-*, M is any one of titanium (Ti), zirconium (Zr), and hafnium (Hf), X is one of halogen, an alkyl group of C$_{1-10}$, and an alkenyl group of C$_{2-10}$, and R$_1$-*, R$_2$-*, R$_3$-*, R$_4$-*, R$_5$-*, R$_6$-*, R$_7$-*, R$_8$-*, R$_9$-*, R$_{10}$-* are each independently one of H-*, an alkyl group of C$_{2-10}$, a cycloalkyl group of C$_{3-6}$, and an aryl group of C$_{6-14}$.

<Chemical Formula 2>

In Chemical Formula 2, in *-MX$_2$-*, M is any one of titanium (Ti), zirconium (Zr), and hafnium (Hf), X is any one of halogen, an alkyl group of C$_{1-10}$, and an alkenyl group of C$_{2-10}$, Q is any one of carbon (C), silicon (Si), germanium (Ge), and tin (Sn), R$_1$-*, R$_2$-*, R$_3$-*, R$_4$-*, R$_5$-*, R$_6$-*, R$_7$-*, R$_8$-*, R$_9$-*, R$_{10}$-*, R$_{11}$-*, and R$_{12}$-* are each independently one of *-H-, an alkyl group of C$_{2-10}$, a cycloalkyl group of C$_{3-6}$, and an aryl group of C$_{6-14}$, and R$_{13}$-* and R$_{14}$-* are each independently an alkyl group of C$_{1-10}$.

In another aspect of the present invention, there is provided a method of preparing an olefin polymer, including: polymerizing olefin monomers in the presence of the hybrid metallocene-supported catalyst.

In still another aspect of the present invention, there is provided an olefin polymer, having a molecular weight distribution of 2 to 5, a weight average molecular weight of 100×10$^3$ g/mol to 200×10$^3$ g/mol, wherein a ratio of melt strength measured at 190° C. to the weight average molecular weight is more than 0.85×10$^{-3}$.

Other details are included in the detailed description and the drawings.

Advantageous Effects

The hybrid metallocene-supported catalyst according to an embodiment of the present invention can be used to improve the melt strength of an olefin polymer.

The method of preparing an olefin polymer according to another embodiment of the present invention can provide an olefin polymer having improved melt strength.

The olefin polymer according to still another embodiment of the present invention has improved melt strength.

The effects of the present invention are not limited to the above-described effects, and other unmentioned effects will be clearly understood to those skilled in the art from the detailed description of the present invention given below.

DESCRIPTION OF DRAWINGS

The above and other subjects, features and advantages of the present invention will be more apparent from the following detailed description taken in conjunction with the accompanying drawings, in which.

BEST MODE FOR INVENTION

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

In the present specification, the term "$C_{A-B}$" means that the number of carbon atoms is A or more and B or less, and "A to B" means A or more and B or less.

In the present specification, the "*" means a bonding site.

Hereinafter, embodiments of the present invention will be described in detail with reference to Preparation Examples and Comparative Examples.

A hybrid metallocene-supported catalyst according to an embodiment includes: a carrier; at least one first metallocene compound supported in the carrier, among compounds represented by Chemical Formula 1; at least one second metallocene compound supported in the carrier, among compounds represented by Chemical Formula 2; and a co-catalyst compound supported in the carrier.

<Chemical Formula 1>

In Chemical Formula 1, in *-$MX_2$—*, M is any one of titanium (Ti), zirconium (Zr), and hafnium (Hf), X is one of halogen, an alkyl group of $C_{1-10}$, and an alkenyl group of $C_{2-10}$, and $R_1$—*, $R_2$—*, $R_3$—*, $R_4$—*, $R_5$—*, $R_6$—*, $R_7$—*, $R_8$—*, $R_9$—*, $R_{10}$—* are each independently one of H—*, an alkyl group of $C_{2-10}$, a cycloalkyl group of $C_{3-6}$, and an aryl group of $C_{6-14}$.

In Chemical Formula 1, among Rm-*s (m is 1 to 10), two adjacent $R_n$—* and $R_{n+1}$—* (n is 1 to 9) form an unsubstituted or substituted single or multiple ring compound of $C_{1-15}$ with an alkyl group of $C_{1-4}$, and Rm-*s other than $R_n$—* and $R_{n+1}$—* are each independently one of H—*, an alkyl group of $C_{2-10}$, a cycloalkyl group of $C_{3-6}$, and an aryl group of $C_{6-14}$. The unsubstituted or substituted single ring compound of $C_{1-15}$ with an alkyl group of $C_{1-4}$ may be an aliphatic cyclic compound or an aromatic cyclic compound, and the unsubstituted or substituted multiple ring compound of $C_{1-15}$ with an alkyl group of $C_{1-4}$ may be an aliphatic cyclic compound, an aromatic cyclic compound, or a hybrid cyclic compound of the aliphatic cyclic compound and the aromatic cyclic compound.

The first metallocene compound may be at least one of compounds represented by Chemical Formulae 1-1 to 1-24.

<Chemical Formula 1-1>

<Chemical Formula 1-2>

<Chemical Formula 1-3>

<Chemical Formula 1-4>

<Chemical Formula 1-5>

<Chemical Formula 1-6>

<Chemical Formula 1-7>

<Chemical Formula 1-8>

<Chemical Formula 1-9>

<Chemical Formula 1-10>

<Chemical Formula 1-11>

<Chemical Formula 1-12>

<Chemical Formula 1-13>

<Chemical Formula 1-14>

<Chemical Formula 1-15>

<Chemical Formula 1-16>

<Chemical Formula 1-17>

<Chemical Formula 1-18>

<Chemical Formula 1-19>

<Chemical Formula 1-20>

<Chemical Formula 1-21>

<Chemical Formula 1-22>

<Chemical Formula 1-23>

<Chemical Formula 1-24>

In Chemical Formulae 1-1 to 1-24, Me-* is a methyl group, Bu-* is a butyl group, Ph-* is a phenyl group, Tol-* is a toluene group or a methylphenyl group, and Naph-* is a naphthalene group.

<Chemical Formula 2>

In Chemical Formula 2, in *-MX$_2$—*, M is any one of titanium (Ti), zirconium (Zr), and hafnium (Hf), X is any one of halogen, an alkyl group of C$_{1-10}$, and an alkenyl group of C$_{2-10}$. In Chemical Formula 2, *-Q-* is any one of carbon (C), silicon (Si), germanium (Ge), and tin (Sn), R$_1$—*, R$_2$—*, R$_3$—*, R$_4$—*, R$_5$—*, R$_6$—*, R$_7$—*, R$_8$—*, R$_9$—*, R$_{10}$—*, R$_{11}$—*, and R$_{12}$—* are each independently one of *—H—, an alkyl group of C$_{2-10}$, a cycloalkyl group of C$_{3-6}$, and an aryl group of C$_{6-14}$, and R$_{13}$—* and R$_{14}$—* are each independently an alkyl group of C$_{1-10}$.

In Chemical Formula 2, among Rm-*s (m is 1 to 12), two adjacent R$_n$—* and R$_{n+1}$—* (n is 1 to 11) may form an unsubstituted or substituted single or multiple ring compound of C$_{1-15}$ with an alky group of C$_{1-4}$. In this case, Rm-*s other than R$_n$—* and R$_{n+1}$—* are each independently one of *—H—, an alkyl group of C$_{2-10}$, a cycloalkyl group of C$_{3-6}$, and an aryl group of C$_{6-14}$. The unsubstituted or substituted single ring compound of C$_{1-15}$ with an alkyl group of C$_{1-4}$ may be an aliphatic cyclic compound or an aromatic cyclic compound, and the unsubstituted or substituted multiple ring compound of C$_{1-15}$ with an alkyl group of C$_{1-4}$ may be an aliphatic cyclic compound, an aromatic cyclic compound, or a hybrid cyclic compound of the aliphatic cyclic compound and the aromatic cyclic compound.

Further, in Chemical Formula 2, in the alkyl group of C$_{1-20}$ or the unsubstituted or substituted single or multiple ring compound of C$_{1-15}$ with an alkyl group of C$_{1-4}$, one or more carbon atoms may be substituted with one of nitrogen (N), oxygen (O), and sulfur (S).

The second metallocene compound may be at least one of compounds represented by Chemical Formulae 2-1 to 2-20.

<Chemical Formula 2-1>

<Chemical Formula 2-2>

<Chemical Formula 2-3>

<Chemical Formula 2-4>

<Chemical Formula 2-5>

<Chemical Formula 2-6>

<Chemical Formula 2-7>

<Chemical Formula 2-8>

<Chemical Formula 2-9>

<Chemical Formula 2-10>

<Chemical Formula 2-11>

<Chemical Formula 2-12>

<Chemical Formula 2-13>

<Chemical Formula 2-14>

<Chemical Formula 2-15>

<Chemical Formula 2-16>

<Chemical Formula 2-17>

<Chemical Formula 2-20>

<Chemical Formula 2-18>

<Chemical Formula 2-19>

In Chemical Formulae 2-1 to 2-20, Ph-* is a phenyl group.

The first metallocene compound and the second metallocene compound may be used together with the co-catalyst compound to be used as a polymerization catalyst for preparing an olefin polymer.

The co-catalyst compound is not particularly limited as long as it is widely used in the field of metallocene catalysts. For example, the co-catalyst compound may be at least one of at least one of compounds represented by Chemical Formula 3 and at least one of compounds represented by Chemical Formula 4.

<Chemical Formula 3>

In Chemical Formula 3, Ra-* is halogen-*, or a unsubstituted or substituted alkyl group of $C_{1-20}$, cycloalkyl group of $C_{3-6}$, or aryl group of $C_{6-14}$ with halogen, and n is an integer of 2 or more.

<Chemical Formula 4>

In Chemical Formula 4, D is aluminum or boron, Rb-* to Rd-* are the same as or different from each other and are each independently halogen-*, or a unsubstituted or substituted alkyl group of $C_{1-20}$, cycloalkyl group of $C_{3-6}$, or aryl group of $C_{6-14}$ with halogen, and n is an integer of 2 or more.

The carrier is not particularly limited as long as it can support the first metallocene compound, the second metallocene compound, and the co-catalyst compound. For example, the carrier may be carbon, silica, alumina, zeolite, or magnesium chloride.

As a method of supporting the first metallocene compound, the second metallocene compound and the co-catalyst compound on the carrier, a physical adsorption method or a chemical adsorption method may be used.

For example, the physical adsorption method may be a method of contacting the carrier with a solution in which the first metallocene compound, the second metallocene compound, and the co-catalyst compound are dissolved and drying the solution, or may be a method including the steps of: contacting the carrier with a solution in which the first metallocene compound and the second metallocene compound are dissolved and drying the solution to prepare a carrier supported with the first metallocene compound and the second metallocene compound; contacting the carrier with a solution in which the co-catalyst compound is dissolved and drying the solution to prepare a carrier supported with the co-catalyst compound; and mixing these carriers.

For example, the chemical adsorption method may be a method of supporting the co-catalyst compound on the surface of the carrier and then supporting the co-catalyst compound with the first metallocene compound and the second metallocene compound, or may be a method of covalent-bonding a functional group of the surface of the carrier (for example, in the case of silica, a hydroxyl group (—OH) of the surface of silica) with the first metallocene compound and the second metallocene compound.

The sum of the amount of the first metallocene compound to be supported and the amount of the second metallocene compound to be supported may be 0.5 parts by weight to 3.0 parts by weight based on 1 g of the carrier, and the amount of the co-catalyst compound to be supported is 20 parts by weight to 30 parts by weight based on 1 g of the carrier.

Meanwhile, a method of preparing an olefin polymer according to another embodiment of the present invention includes the step of polymerizing olefin monomers in the presence of the hybrid metallocene-supported catalyst.

Examples of the olefin monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, and 1-hexadecene. The olefin polymer may be a homopolymer or a copolymer. The copolymer may be, for example, a copolymer of ethylene and α-olefin. The α-olefin may be, for example, at least one selected from 1-butene, 1-hexene, and 1-octene.

The olefin polymer may be prepared by, for example, a gas phase polymerization method, a solution polymerization method, or a slurry polymerization method. When the olefin polymer is prepared by a solution polymerization method or a slurry polymerization method, examples of solvents to be used may include: aliphatic hydrocarbon solvents of $C_{5-12}$ such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof. However, the present invention is not limited thereto.

An olefin polymer according to still another embodiment of the present invention has a molecular weight distribution of 2 to 5 and a weight average molecular weight of $100 \times 10^3$ g/mol to $200 \times 10^3$ g/mol. Here, the ratio of melt strength measured at 190° C. to the weight average molecular weight is $0.85 \times 10^{-3}$ or more, preferably $0.90 \times 10^{-3}$ or more, and more preferably $0.95 \times 10^{-3}$ or more.

The measured melt strength may be 125 cN or more, and preferably 140 cN or more. The slope of a graph relating to a shear rate and tan δ is −0.20 or more in a shear rate range of 0.1 rad/s to 100 rad/s. The slope of Han plot is 1.24 or less in a loss modulus range of 104 dyne/cm³ to 106 dyne/cm³. The density of the olefin polymer may be more than 0.920 kg/cm³ and less than 0.950 kg/cm³, the melt index of the olefin polymer measured at 190° C. may be more than 1.0 g/10 min and less than 1.5 g/10 min, and the value obtained by dividing the extrusion amount of the olefin polymer for 10 minutes at a load of 21.6 kg by the extrusion amount of the olefin polymer for 10 minutes at a load of 2.16 kg may be more than 20 and less than 40.

Hereinafter, Preparation Examples of the hybrid metallocene-supported catalyst according to an embodiment of the present invention and Preparation Examples of the olefin polymer according to another embodiment of the present invention will be described in detail.

(Preparation Example of First Metallocene Compound)

In a dry box, indene (5 g, 0.043 mol) was dissolved in hexane (150 mL), sufficiently mixed, and then cooled to −30° C. to obtain a hexane solution. Then, a 2.5 M n-butyl lithium (n-BuLi) hexane solution (17 mL, 0.043 mol) was dropped into this hexane solution, and was stirred overnight at room temperature to obtain a white suspension. The white suspension was filtered by a glass filter to obtain a white solid, the white solid was sufficiently dried, and then 5.2 g of an indene lithium salt was obtained in a yield of 99%.

In a dry box, cyclopentadienyl zirconium trichloride ($CpZrCl_3$) (2.24 g, 8.53 mmol) was slowly dissolved in ether (30 mL), and then cooled to −30° C. to obtain an ether solution. Then, an indene lithium salt (105 g, 8.53 mmol) dissolved in ether (30 mL) was slowly dropped into this ether solution, and was then stirred overnight to obtain a yellow suspension. Then, under reduced pressure, ether was removed from the yellow suspension, and then the resulting yellow suspension was extracted with methylene chloride (50 mL) to obtain extracts. The extracts passed through a celite to remove lithium chloride (LiCl), and then dried to obtain 2.82 g of a refined first metallocene compound in a yield of 97%.

(Preparation Example of Second Metallocene Compound)

-continued

Step A: Synthesis of 2-methyl-7-phenyl-1H-indene

7-Bromo-2-methyl-1H-indene (7 g, 1 equivalent) and [1,3-bis-(diphenylphosphino) propane] nickel (II) chloride (Ni (dppp) Cl$_2$) (363 mg, 0.02 equivalents) were introduced into ether (100 mL), a 3.0 M phenylmagnesium bromide (PhMgBr) ether solution (8.23 g, 1.05 equivalents) was added thereto for 1 hour, and then the mixed solution was refluxed and stirred at 50° C. for 12 hours while gradually raising temperature.

After completion of the reaction, the solution was immersed in an ice bath, and 1 N hydrochloric acid was added thereto to lower the hydrogen ion concentration index to pH 4. Then, an organic layer was extracted from the solution, treated with magnesium sulfide (MgSO$_4$) to remove water, and then dried to obtain 6.68 g (yield: 97%) of 2-methyl-7-phenyl-1H-indene which is a white solid.

[1H-NMR (CDCl$_3$, 300 MHz), 7.61-7.12 (m, 8H), 6.54 (s, 1H), 3.38 (s, 2H), 2.14 (s, 3H)]

Step B: Synthesis of dimethylbis(2-methyl-4-phenylindenyl)silane 2-methyl-7-phenyl-1H-indene (2.14 g, 1 equivalent) was introduced into 50 mL of hexane, a 1.6 M n-butyl lithium (n-BuLi) hexane solution (7.8 mL, 1.2 equivalents) was slowly added thereto at −30° C., the temperature was raised to room temperature, and then the mixed solution was stirred at room temperature for 12 hours to obtain a solid. The obtained solid was filtered, washed with hexane, and then dried under vacuum to obtain 2-methyl-4-phenyl-indenyl lithium (1.5 g, 2 equivalents). Then, 20 mL of toluene and 5 mL of tetrahydrofuran (THF) were introduced into the obtained 2-methyl-4-phenyl-indenyl lithium (1.5 g, 2 equivalents), dimethyldichlorosilane (456 mg, 1 equivalent) was slowly added thereto at −30° C., the temperature was raised to 80° C., and then the mixed solution was stirred at 80° C. for 2 hours. After completion of the reaction, a solvent was removed, and an organic layer was extracted using a mixed solution of ether and water and treated with magnesium sulfide (MgSO$_4$) to remove water. 1.3 g (yield: 80%) of dimethylbis(2-methyl-4-phenylindenyl)silane was obtained using column chromatography. At this time, a mixed solution of hexane and methylene chloride having a volume ratio of 20:1 was used as a mobile phase.

[1H-NMR (CDCl$_3$, 300 MHz), 7.56-7.14 (m, 16H), 6.80 (m, 2H), 3.80(S, 2H), 2.25 (s, 3H), 2.17 (s, 3H), 0.17(m, 6H)]

Step C: synthesis of rac-dimethylsilylbis(2-methyl-4-phenylindenyl)zirconium dichloride A 1.6 M n-butyl lithium (n-BuLi) hexane solution (4 mL, 2.1 equivalents) was slowly added to a solution in which dimethyl-bis(2-methyl-4-phenylindenyl)silane (1.4 g, 1 equivalent) was dissolved in 20 mL of ether at −30° C., the temperature was slowly raised to room temperature, and then the mixed solution was stirred at room temperature for 12 hours. Then, a solvent was dried to obtain a solid. The solid was washed with hexane, and dried under vacuum to obtain a dilithium salt. Then, a solution of the dilithium salt (1 g, 2 equivalents) and ether (100 mL) was slowly added to zirconium chloride (ZrCl$_4$) (484 mg, 1 equivalent) at −30° C., the temperature was slowly raised, and then the mixed solution was stirred for 4 hours. After completion of the reaction, a solvent was removed, and 130 mg (yield: 10%) of rac-dimethylsilylbis(2-methyl-4-phenylindenyl)zirconium dichloride was obtained by a recrystallization method using methylene chloride as a recrystallization solvent.

[1H-NMR (CDCl$_3$, 300 MHz), 7.68-7.10 (m, 16H), 6.95 (s, 2H), 2.26 (s, 6H), 1.34(s, 6H)].

(Preparation Example of First Hybrid Metallocene-Supported Catalyst)

When the first and second metallocene compound and methyl aluminum oxane (MAO) as a co-catalyst react with moisture or oxygen in the air, activity is lost. Therefore, all experiments were carried out using a glove box and a Schlenk technique under nitrogen conditions. A 10 L supported catalyst reactor was used in a state of being washed to remove foreign mater, dried at 110° C. for 3 hours, sealed, and then dried in vacuum to completely moisture.

A 10% methyl aluminum oxane (MAO) solution (methyl aluminum oxane: 1188 g) was added to the 2.862 g of the first metallocene compound and 3.469 g of the second metallocene compound, and the mixed solution was stirred at room temperature for 1 hour. 300 g of silica was put into the reactor, and then 900 mL of refined toluene was additionally put into the reactor, followed by stirring. After completion of stirring for 1 hour, the first metallocene compound, the second metallocene compound, and methyl aluminum oxane were added to the mixed solution while stirring in the reactor. The reactor was heated to about 60° C., followed by stirring for 2 hours.

After the precipitation reaction, a supernatant was removed.

(Preparation Example of Second Hybrid Metallocene-Supported Catalyst)

A second hybrid metallocene-supported catalyst was prepared in the same manner as in the preparation example of the first hybrid metallocene-supported catalyst, except that 2.389 g of the first metallocene compound was used and 4.387 g of the second metallocene compound was used.

(Preparation Example of First Olefin Polymer)

The first hybrid metallocene-supported catalyst was introduced into a single gas phase polymerization process to prepare a polyolefin copolymer. 1-hexene was used as a comonomer. Operation conditions are summarized in Table 1.

(Preparation Example of Second Olefin Polymer)

The second hybrid metallocene-supported catalyst was introduced into a single gas phase polymerization process to prepare a polyolefin copolymer. 1-hexene was used as a comonomer. Operation conditions are summarized in Table 1.

TABLE 1

| Operation conditions | First olefin polymer | Second olefin polymer |
|---|---|---|
| Ethylene partial pressure (K/G) | 15.0 | 15.1 |
| Operation temperature (° C.) | 92.0 | 92.0 |
| Hydrogen molar ratio/ethylene molar ratio (%) | 0.066 | 0.102 |
| 1-Hexene molar ratio/ethylene molar ratio (%) | 0.35 | 0.43 |
| Melt index (g/10 min) | 0.67 | 0.72 |
| Melt flow rate (MFR) | 50.17 | 75.9 |
| Density (g/cc) | 0.9418 | 0.9407 |

EXPERIMENTAL EXAMPLES

The densities, melt indexes, melt flow rates, molecular weights, molecular weight distributions, melt strengths, and rheological properties of the olefin polymers according to Examples and Comparative Examples below were measured. The measurement results of the physical properties are summarized in Tables 2 and 3 below. In Tables 2 and 3, Example 1 is a first olefin polymer, and Example 2 is a second olefin polymer.

Comparative Example 1

DX900, which is a commercial pipe product manufactured by SK Innovation Co., Ltd., was used.

Comparative Example 2

SP988, which is a commercial pipe product manufactured by LG Chem Co., Ltd., was used.

Comparative Example 3

C910A, which is a commercial pipe product manufactured by Hanwha TOTAL Petrochemical Co., Ltd., was used.

Comparative Example 4

HDPE 7303, which is a commercial bottle cap product manufactured by SK Innovation Co., Ltd., was used.

Comparative Example 5

A commercial LG ME2500 product manufactured by LG Chem Co., Ltd., was used.

Physical Property Measuring Method
1) Density was measured according to ASTM 1505.
2) Melt index ($I_2$, 2.16 kg), which is an extrusion amount for 10 min at a load of 2.16 kg, was measured at 190° C. according to ASTM 1238.
3) Melt flow rate: a rate obtained by dividing flow index ($I_{21}$, a load of 21.6 kg) by melt index ($I_2$, a load of 2.16 kg).
4) Molecular weight and molecular weight distribution (PDI): number average molecular weight (Mn), weight average molecular weight (Mw), and Z average molecular weight were measured using gel permeation chromatography (GPC-FTIR) at 160° C. Molecular weight distribution (PDI, Mw/Mn) is expressed by a ratio of weight average molecular weight to number average molecular weight.

5) Melt strength
Measurement of melt strength was performed on a Gotfert Rheotens attached to a Gottfert Rheotester 2000 Capillary Rheometer. A polymer was extruded through a capillary having a flat inlet angle with a capillary diameter of 2.0 mm and an aspect ratio (capillary length/capillary diameter) of 10. After equilibrating a sample at 190° C. for 5 minutes, a piston was allowed to move at a constant speed of 0.32 mm/s. Experimental temperature was 190° C. The sample was stretched in a set with an accelerating nip located 100 mm below a die by using an acceleration of 2.4 mm/s². Tensile strength was recorded as a function of a winding speed of a nip roll.

6) Measurement of rheological properties
Measurement of dynamic viscoelastic properties depending on frequency variation (Dynamic frequency sweep test): Measurement of rheological properties was performed using a rheometer (Advanced Rheometric Expansion System, ARES). The frequency range was 0.1 to 500 rad/s, the experimental temperature was 190° C., the measurement was performed under a nitrogen atmosphere, and the strain was 10%.

TABLE 2

| | Density (Kg/cm³) | Melt index ($I_2$) (g/10 min) | MFR | Mw (×10³ g/mol) |
|---|---|---|---|---|
| Example 1 | 0.9437 | 1.1 | 30.7 | 138.9 |
| Example 2 | 0.9443 | 1.1 | 37.6 | 145.2 |
| Comparative Example 1 | 0.9384 | 0.6 | 25.1 | 140.1 |
| Comparative Example 2 | 0.9438 | 0.7 | 35.0 | 150.0 |
| Comparative Example 3 | 0.9556 | 2.4 | 28.5 | 135.6 |
| Comparative Example 4 | 0.9523 | 2.1 | 37.4 | 248.2 |
| Comparative Example 5 | 0.9538 | 2.1 | 28.5 | 208.5 |

TABLE 3

| | PDI | Melt strength (M.S) (cN) | Slope of log(tanδ) at shear rate (ω) of 0.1 to 100 rad/s | Slope of logG"-ogG' plot (Han plot) | Melt strength (×10⁻³ cN · mol/g) |
|---|---|---|---|---|---|
| Example 1 | 2.53 | 141.1 | −0.18 | 1.24 | 1.02 |
| Example 2 | 3.05 | 143.6 | −0.13 | 1.20 | 0.99 |
| Comparative Example 1 | 3.07 | 82.4 | −0.31 | 1.41 | 0.59 |
| Comparative Example 2 | 2.88 | 122.0 | −0.27 | 1.40 | 0.81 |
| Comparative Example 3 | 5.5 | 63.7 | −0.34 | 1.42 | 0.47 |
| Comparative Example 4 | 21.3 | 53.1 | −0.15 | 1.26 | 0.21 |
| Comparative Example 5 | 7.2 | 84.3 | −0.28 | 1.38 | 0.40 |

The slope of log(tan δ) at a shear rate (ω) of 0.1 rad/s to 100 rad/s is a slope of log(tan δ) and log(w). For example, the slope of log(tan δ) in Example 1 is calculated by Equation 1.

(Equation 1)

$$\{\log(1.274) - \log(4.547)\}/\{\log(100) - \log(0.1)\} = -0.18 \tag{1}$$

Han plot compares the slopes of log(G') with respect to a predetermined log(G") range (for example, values of log (G") of 4.4 and 5.8). For example, the slope of Han plot in Example 1 is calculated by Equation 2.

(Equation 2)

$$\{\log(421803)-\log(7864)\}/\{\log(636940)-\log(25551)\}=1.24 \quad (2)$$

Figure 1:
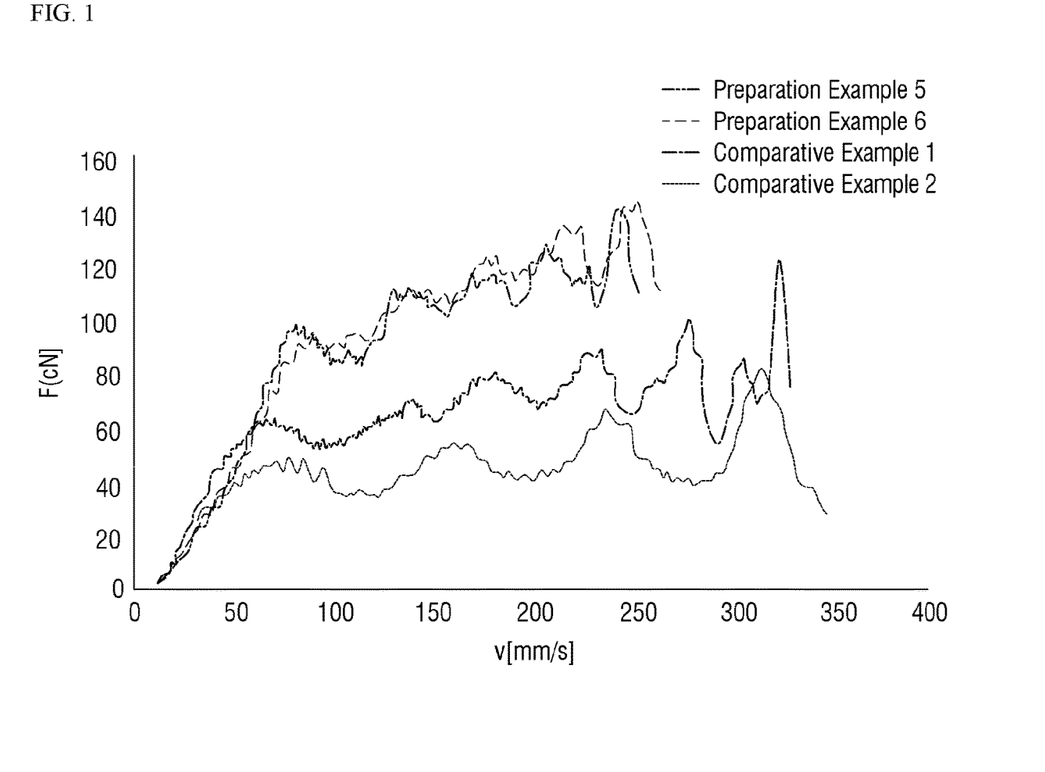
FIG. 1 is a graph of melt strength (F) to pull-off speed.
Figure 2:
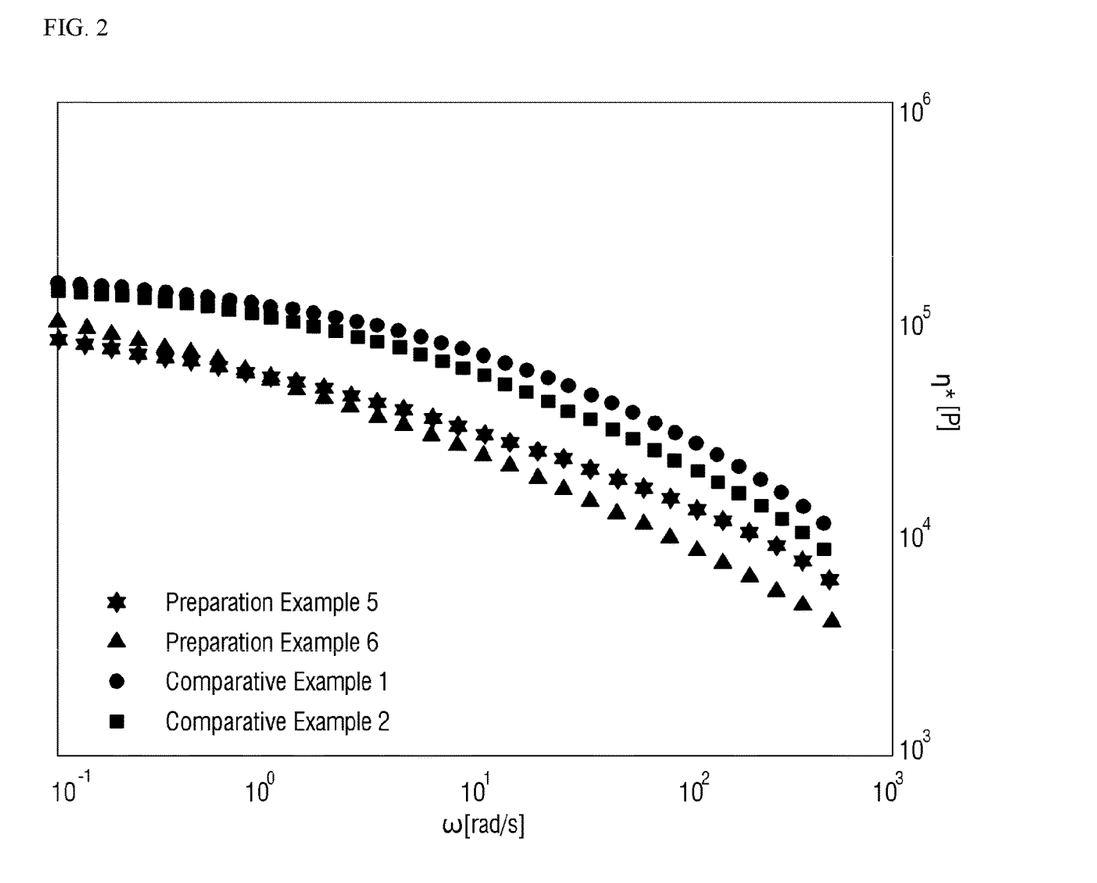
FIG. 2 is a graph of shear viscosity ($*\eta$) to shear rate ($\omega$).
Figure 3:
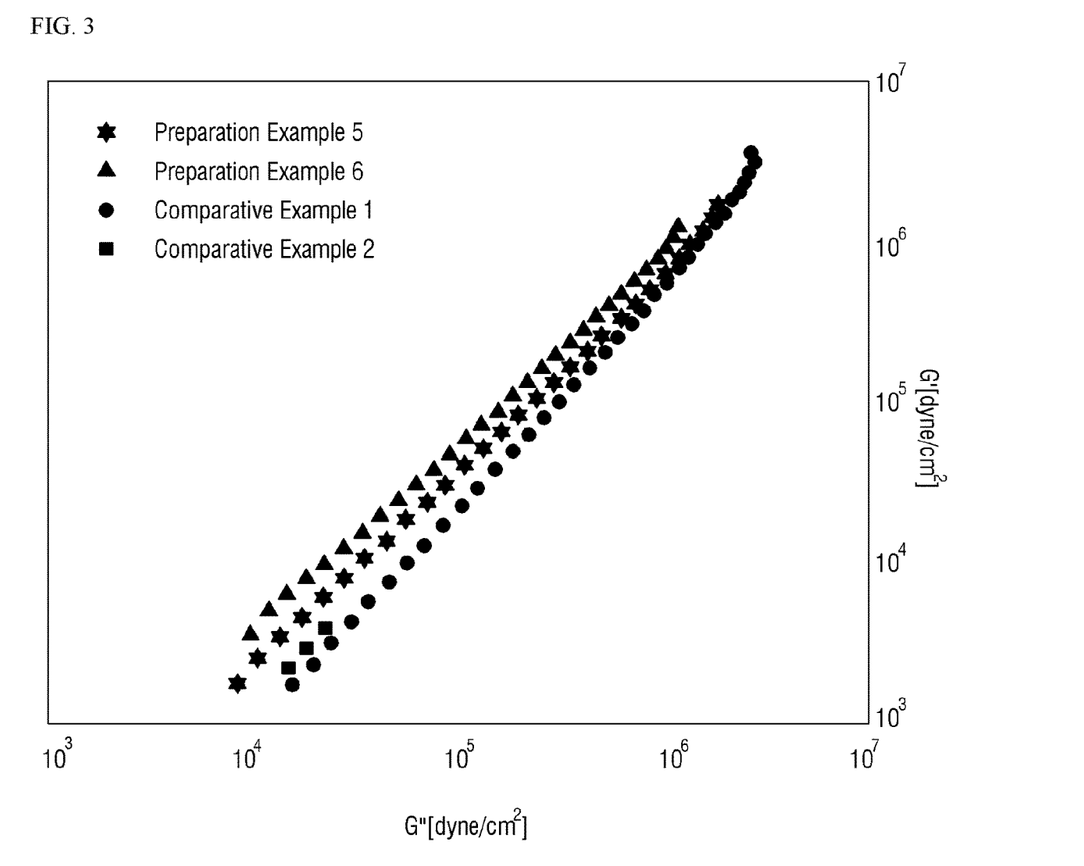
FIG. 3 is a graph of storage modulus (G') to loss modulus (G").
Figure 4:
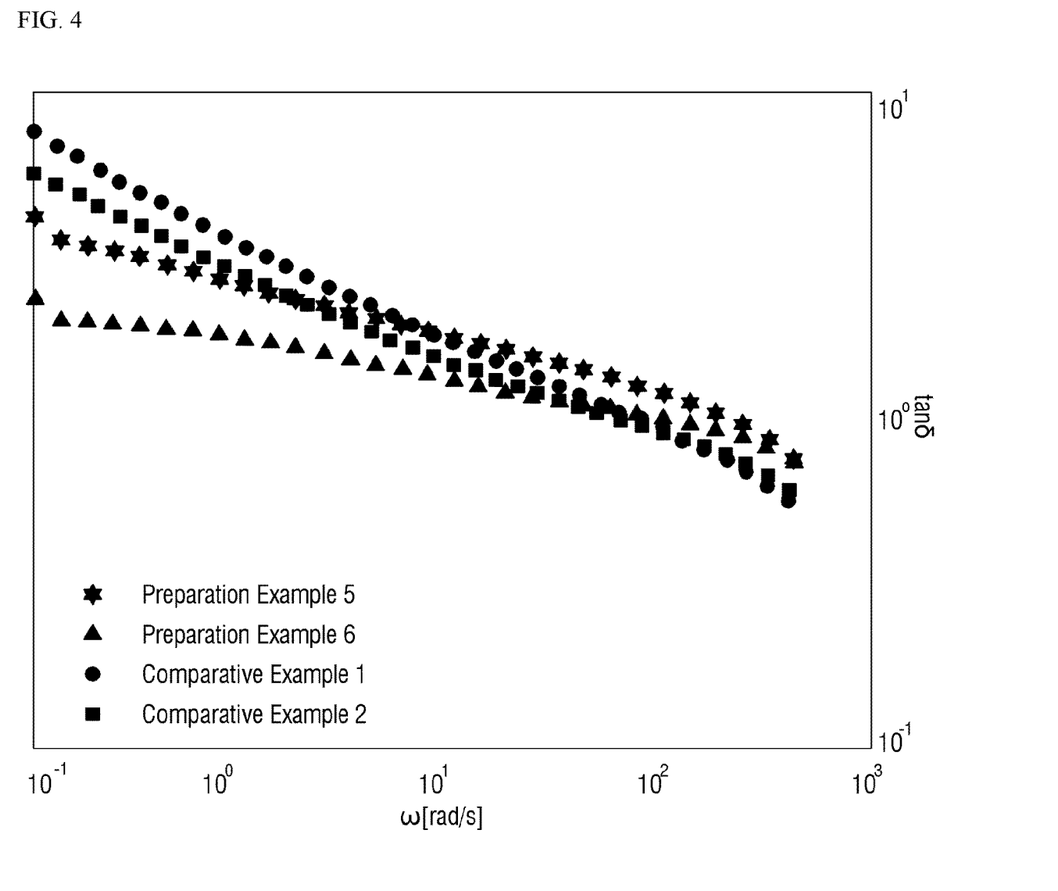
FIG. 4 is a graph of tan δ to shear rate ($\omega$).

Referring to FIGS. 1 to 4 and Tables 2 to 3, in Examples 1 and 2, M.S. tends to be high although Mw is low. Generally, as Mw increases, M.S. tends to increase. However, Examples 1 and 2 have similar Mw to Comparative Examples 1, 2, and 3 and have higher M.S. than Comparative Examples 1, 2, and 3. Further, Examples 1 and 2 have lower Mw to Comparative Examples 4 and 5, but have higher M.S. than Comparative Examples 4 and 5. Examples 1 and 2 exhibit equivalent workability to Comparative Examples. Meanwhile, the elasticity of a material increases as the scope of tan δ increases, and the miscibility in a resin is improved as the slope of Han plot approximates to 2. Further, as the proportion of long chain branches in the resin increases, the miscibility in the resin deteriorates, so that the slope of Han plot approximates to 1. When long chain branches are introduced into the resin, the elasticity of a material may increase, and the miscibility in the resin may slightly deteriorate. It can be found that Examples 1 and 2 have elasticity and miscibility equivalent to or better than those of Comparative Examples. Examples 1 and 2 have melt strength better than that of Comparative Examples while having elasticity and miscibility equivalent to or better than those of Comparative Examples.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:
1. A hybrid metallocene-supported catalyst, comprising:
a carrier;
at least one first metallocene compound supported in the carrier, among compounds represented by Chemical Formula 1;
at least one second metallocene compound supported in the carrier, among compounds represented by Chemical Formula 2; and
a co-catalyst compound supported in the carrier:

<Chemical Formula 1> in Chemical Formula 1, in *-MX$_2$—*, M is any one of titanium (Ti), zirconium (Zr), and hafnium (Hf), X is one of halogen, an alkyl group of $C_{1-10}$, and an alkenyl group of $C_{2-10}$, and $R_1$—*, $R_2$—*, $R_3$—*, $R_4$—*, $R_5$—*, $R_6$—*, $R_7$—*, $R_8$—*, $R_9$—*, $R_{10}$—* are each independently one of H—*, an alkyl group of $C_{2-10}$, a cycloalkyl group of $C_{3-6}$, and an aryl group of $C_{6-14}$, <Chemical Formula 2> in Chemical Formula 2, in *-MX$_2$—*, M is any one of titanium (Ti), zirconium (Zr), and hafnium (Hf), X is any one of halogen, an alkyl group of $C_{1-10}$, and an alkenyl group of $C_{2-10}$, Q is any one of carbon (C), silicon (Si), germanium (Ge), and tin (Sn), $R_1$—*, $R_2$—*, $R_3$—*, $R_4$—*, $R_5$—*, $R_6$—*, $R_7$—*, $R_8$—*, $R_9$—*, $R_{10}$—*, $R_{11}$—*, and $R_{12}$—* are each independently one of *—H—, an alkyl group of $C_{2-10}$, a cycloalkyl group of $C_{3-6}$, and an aryl group of $C_{6-14}$, and $R_{13}$—* and $R_{14}$—* are each independently an alkyl group of $C_{1-10}$,
wherein a sum of an amount of the first metallocene compound to be supported and an amount of the second metallocene compound to be supported is 0.5 parts by weight to 3.0 parts by weight based on 1 g of the carrier, and
an amount of the co-catalyst compound to be supported is 20 parts by weight to 30 parts by weight based on 1 g of the carrier.
2. The hybrid metallocene-supported catalyst of claim 1, wherein, in Chemical Formula 1, among Rm-*s (m is 1 to 10), two adjacent $R_n$—* and $R_{n+1}$—* (n is 1 to 9) form
i) an unsubstituted single or multiple ring compound of $C_{3-15}$ with an alkyl group of $C_{1-4}$,
ii) a substituted single or multiple ring compound of $C_{3-15}$ by alkyl group of $C_{1-4}$, and Rm-*s other than $R_n$—* and $R_{n+1}$—* are each independently one of H—*, an alkyl group of $C_{2-10}$, a cycloalkyl group of $C_{3-6}$, and an aryl group of $C_{6-14}$.
3. The hybrid metallocene-supported catalyst of claim 1, wherein, in Chemical Formula 2, among Rm-*s (m is 1 to 12), two adjacent $R_n$—* and $R_{n+1}$—* (n is 1 to 9) form
i) an unsubstituted or multiple ring compound of $C_{3-15}$ with an alkyl group of $C_{1-4}$, or
ii) a substituted single or multiple ring compound of $C_{3-15}$ by alkyl group of $C_{1-4}$, and Rm-*s other than $R_n$—* and $R_{n+1}$—* are each independently one of *—H—, an alkyl group of $C_{2-10}$, a cycloalkyl group of $C_{3-6}$, and an aryl group of $C_{6-14}$.
4. The hybrid metallocene-supported catalyst of claim 1, wherein the co-catalyst compound is at least one of at least one first co-catalyst compound among compounds represented by Chemical Formula 3 and at least one second co-catalyst compound among compounds represented by Chemical Formula 4:

<Chemical Formula 3>

<Chemical Formula 4> in Chemical Formula 3, Ra-* is halogen-*, or a unsubstituted or substituted alkyl group of $C_{1-20}$, cycloalkyl group of $C_{3-6}$, or aryl group of $C_{6-14}$ with halogen, and n is an integer of 2 or more; and in Chemical Formula 4, D is aluminum or boron, Rb-* to Rd-* are the same as or different from each other and are each independently halogen-*, or a unsubstituted or substituted alkyl group of $C_{1-20}$, cycloalkyl group of $C_{3-6}$, or aryl group of $C_{6-14}$ with halogen.

5. A method of preparing an olefin polymer, comprising:
polymerizing olefin monomers in the presence of the hybrid metallocene-supported catalyst according claim 1.

6. The method of claim 5,
wherein the olefin monomer is at least one selected from ethylene, propylene, 1-butene, 1-hexene, and 1-octene.

* * * * *